US006159371A

United States Patent [19]
Dufay

[11] Patent Number: 6,159,371
[45] Date of Patent: Dec. 12, 2000

[54] CONSTRUCTED WETLANDS REMEDIATION SYSTEM

[75] Inventor: John A. Dufay, Albuquerque, N. Mex.

[73] Assignee: Albuquerque Public Schools District No. 12, Albuquerque, N. Mex.

[21] Appl. No.: 09/087,596

[22] Filed: May 29, 1998

Related U.S. Application Data

[63] Continuation of application No. 60/048,332, May 30, 1997.

[51] Int. Cl.$^7$ ........................................................ C02F 3/32
[52] U.S. Cl. .......................... 210/602; 210/620; 210/150; 210/170; 210/220; 210/903
[58] Field of Search ................................... 210/150, 151, 210/170, 220, 602, 903, 605, 620

[56] References Cited

U.S. PATENT DOCUMENTS

| | | | |
|---|---|---|---|
| 3,770,632 | 11/1973 | Seidel | 210/602 |
| 4,218,318 | 8/1980 | Niimi et al. | 210/150 |
| 4,443,337 | 4/1984 | Otani et al. | |
| 4,569,756 | 2/1986 | Klein | |
| 4,678,582 | 7/1987 | Lavigne | 210/602 |
| 4,839,051 | 6/1989 | Higa | 210/170 |
| 4,855,040 | 8/1989 | Kickuth | 210/170 |
| 4,906,359 | 3/1990 | Cox, Jr. | |
| 4,959,084 | 9/1990 | Wolverton et al. | |
| 5,078,882 | 1/1992 | Northrop | |
| 5,087,353 | 2/1992 | Todd et al. | |
| 5,156,741 | 10/1992 | Morrison et al. | 210/170 |
| 5,174,897 | 12/1992 | Wengrzynek | 210/170 |
| 5,273,653 | 12/1993 | Kickuth | 210/170 |
| 5,472,472 | 12/1995 | Northrop | 210/602 |
| 5,486,291 | 1/1996 | Todd | |
| 5,527,453 | 6/1996 | Hachima | |
| 5,637,218 | 6/1997 | Kickuth | 210/170 |
| 5,690,827 | 11/1997 | Simmering | |
| 5,702,593 | 12/1997 | Horsley et al. | |
| 5,736,047 | 4/1998 | Ngo | 210/170 |
| 5,863,433 | 1/1999 | Behrends | 210/150 |

OTHER PUBLICATIONS

Anonymous, "Microstrainers Aid Pollution Control", *European Water & Sewage,* Oct., 1986, p. 440, 442–443, vol. 90, No. 1088 (Abstract only).

Anonymous, "Tertiary Filtration of Wastewaters", *Journal of Environmental Engineering,* Dec., 1986, p. 1008–1026, vol. 112, No. 6 (Abstract only).

Barbieri, J.M., et al., "Paris Improves Its Drinking Water Treatment Plants", *Journal of the Institution of Water & Environmental Management,* p. 2–12 (Abstract only).

Panswad, Thongchai, et al., "Water Quality and Occurrences of Protozoa and Metazoa in Two Constructed Wetlands Treating Different Wastewaters in Thailand", *Water Science & Technology,* p. 183–188, 1997, vol. 36, No. 12 (Abstract only).

Reddy, K.R., et al., "State–of–the–Art Utilization of Aquatic Plans in Water Pollution Control", *Water Science & Technology,* 1987, vol. 19, No. 10 (Abstract only).

Stockdale, Erik C., et al., "Prospects for Wetlands Use in Stormwater Management", Coastal Zone '87, Proceedings of the Fifth Symposium on Coastal and Ocean Management, p. 3701–3714, vol. 4, ASCE, New York, N.Y. (Abstract only).

Tyre, Bryan W., et al., "On–Site Sewage Disposal for a Subdivision in a High Groundwater Area", Proceedings of the 1997 Symposium on Site Characterization and Design of On–Site Septic Systems, p. 283–293, Nov. 1997, vol. 1324, ASTM, Conshohocken, PA. (Abstract only).

Zachritz, Walter H., II, et al., "Performance of an Artificial Wetlands Filter Treating Faculative Lagoon Effluent at Carville, Louisiana", *Water Environment Research,* p. 46–52, Jan.–Feb., 1993, vol. 65, No. 1 (Abstract only).

*Primary Examiner*—Christopher Upton
*Attorney, Agent, or Firm*—Brian J. Pangrle; Nancy E. Ownbey; Deborah A. Peacock

[57] ABSTRACT

Constructed wetlands, utilizing a plurality of cells, in which nitrification and denitrification occurs simultaneously, at low flow rates and lower temperatures. The constructed wetlands provides improved remediation in a shorter period of time.

59 Claims, 5 Drawing Sheets

CONSTRUCTED WETLANDS REMEDIATION SYSTEM

CROSS-REFERENCE TO RELATED APPLICATIONS

This application claims the benefit of the filing of U.S. Provisional Patent Application Ser. No. 60/048,332, entitled Constructed Wetlands System, filed on May 30, 1997, and the specification thereof is incorporated herein by reference.

BACKGROUND OF THE INVENTION

1. Field of the Invention (Technical Field)

The present invention relates to wastewater remediation.

2. Background Art

The following processes pertain to primarily physical aspects of wastewater treatment and natural and artificial wetlands management. Most wastewater treatment techniques start with a primary filtration or sedimentation process. Primary filtration processes generally take advantage of density mismatches between the fluid phase and the suspended phase. Gravity causes materials having densities greater than the fluid phase to settle downward whereas materials having densities less than the fluid phase will rise. Typically, the greater the density difference or buoyancy, the greater the particle acceleration through the fluid. However, other phenomena may affect a particle's acceleration through a fluid medium. For instance, attractive forces may cause particle agglomeration or flocculation. The agglomerate or flocculent may have a density different than individual particles. In addition, hydrodynamics effects will change as the size of the agglomerate or flocculent changes. Particles may also experience hindered settling. Chemical additives or mixing can be used to promote or prevent agglomerate and flocculent formation. Another phenomenon, hindered settling, occurs when the particle number density and corresponding excluded volume is high. Hindered settling is comparatively analogous to fluid flow through a porous medium. Although seemingly simple, primary filtration depends on many variables and an a priori calculation of settling rates is not straightforward.

Fluid can flow through a porous bed due to a pressure difference, a potential or kinetic energy difference, or surface tension related capillary effects. Usually, these driving forces are related and intertwined. Consider a fluid in a porous medium heated by a geothermal source. As the temperature of the water increases, the density will decrease. Although relatively incompressible, water does stratify due to buoyancy effects, hot water rises and cold water sinks. Further, for most fluids at subsonic velocities, a pressure gradient is established where flow occurs from a high pressure to a low pressure region.

Soil can be thought of as a porous medium. For water in natural and artificial soils, flow is driven by a gravitational potential gradient and a matric potential gradient. Vertical fluid flow through natural and artificial soil beds depends to a large extent on the hydraulic conductivity which in turn depends on the matric potential. The hydraulic conductivity is a nonlinear function of the degree of saturation. It is maximum for a saturated bed and roughly one-millionth of the maximum when the bed is one-fourth saturated. The saturated conductivity also depends on the soil texture. Coarse soils have a high saturated conductivity compared to fine soils. Flow in saturated soils relies almost exclusively on the gravity potential gradient as a driving force for flow. The matric potential gradient dominates only during infiltration, especially for horizontal soil beds. For predominantly horizontal soil flows, the gravity potential gradient tends to zero, leaving the matric potential gradient as the main driving force for water infiltration. Infiltration plays an important role in several wastewater processing steps. Knowledge of natural or artificial soils hydraulic conductivity allows for a prediction of the final or steady-state infiltration rate. When combined with an analysis of the rate of water storage in the soil, start-up and periodic operation of a wetted soil bed may be predicted. Such an analysis is helpful when introducing wastewater into a wetlands system and for estimating the rate of soil contamination if a breach occurs in a containment barrier.

Evaporation is another physical process that impacts flow in open soil beds or wetlands. Fluid evaporation from the soil bed surface may cause the concentration of constituents in the soil to increase. On a hot summer day, one square meter of vegetated ground surface may lose over 10 kilograms of water (about two and a half gallons). Evaporation from a saturated soil bed may be substantial and exceed that for a typical vegetated ground surface. If the rate of evaporation exceeds the inlet flow rate, then, given sufficient time, the soil bed will dry. When plants are present, rates for transpiration and plant water uptake need to be estimated and added to the water loss rate from evaporation. The process of transpiration and plant water uptakes starts with the roots. Once in the plant, water moves through the xylem and into the leaves. Water evaporates from the leaves through the sub-stomatal cavities, perhaps the main mechanism for the regulation of water in plants. However, the rate of water loss depends on the evaporative demand of the surrounding air. If the air is saturated, water loss is minimal.

Another physical factor affecting the operation of natural or artificial wetlands is wind. Wind accelerates evaporative water loss thereby cooling the system, introducing seeds of unwanted plant species, driving fluid flow through surface effects, and even destroying plant life. The structure of the wetlands and orientation to the wind may have a profound effect on wind velocity over the vegetated surface. However, as with most crop canopies, the wind velocity drops quickly from the canopy to the ground surface.

Taken together, physical phenomena have a great impact on the functioning of a natural or artificial wetlands system. Proper placement of an artificial wetlands is imperative to ensure an environment conducive to proper operation. Improper placement with respect to the physical surroundings may result in the formation of an adverse microclimate and microhabitat in which the wetlands will not thrive.

The crux of the remediation process relies on the ability of the flora to reduce chemical constituents or waste to nonhazardous forms or acceptable concentration levels. For photosynthetic flora, the process starts with solar radiation. Fortunately, indigenous plants have adapted their own mechanisms to regulate radiative energy uptake. However, these mechanisms can be negated when multiple plant species compete for the same available light. One solution is to choose a variety of plants having different radiation requirements, i.e., some species may thrive on radiation reflected from the surrounding rather than on direct beam radiation. For subsurface species that live in the aqueous phase, water turbidity plays an important role in attenuating radiation. Thus, regulation of the inlet turbidity may be required to ensure that subsurface species survive. In climates sufficiently removed from the equatorial regions of the globe, seasonal variations in radiation also need to be accounted for to ensure a proper degree of remediation. Lastly, radiation has the potential to heat the wetlands directly or indirectly. The degree of energy input into the system by radiation may be controlled through a variety of means. For instance, if the upstream settling tanks used for storage are painted black, the inlet stream will have a higher temperature. Overall, radiation is linked to many different variables that affect the performance of a natural or artificial wetlands system, most intimately through the regulation of photosynthetic flora.

The biological processes that degrade the chemical constituents in the wastewater stream rely on both plant and microbial species. Plants help to assimilate and store contaminants while providing a substrate for microbial growth. For leafy plant species, three factors must be favorable for a leaf to remain alive. Positive average net photosynthesis and non-lethal bounds on leaf water potential and temperature. Plant roots also require a sufficient supply of oxygen to survive. Aquatic plants have the ability to translocate oxygen from the upper leaf areas into the roots producing an aerobic zone around the roots. Oxygen can be supplied to plant roots by several mechanisms. Oxygen may be absorbed at the leaves and travel down the xylem to the roots, or oxygen may be directly introduced through the surrounding soil and water. In active transport processes, the plant expends energy while diffusive transport occurs under thermodynamically favorable conditions. For instance, diffusive transport is favorable when the oxygen concentration in the surrounding soil is greater than the concentration in the plant root. Alternatively, oxygen may enter the root through osmotic movements of water. Grass species typically require a dissolved oxygen level between 1 and 7 ppm.

Commonly used plants for constructed wetlands include common reed, cattail and hardstem bulrush. However, the common reed and hardstem bulrush are invasive and generally require annual harvesting, a labor intensive process. To create an economically favorable constructed wetlands operation, low maintenance and aesthetic plants are preferred. In addition, constructed wetlands may create microclimates and microhabitats that allow non-native species to grow.

Many organisms inhabit wetland environments including Group 1: bacteria such as zoogloca, protoza such as ciliatea, flagellate, rhizopoda and the like and larger organisms, ones that use sludge as food, including nematoda, rotatoria, oligochaeta, anthropoda, and the like. The larger organisms tend to be more sensitive to dissolved oxygen fluctuations.

The organisms play an essential role in the overall processing of the wastewater stream. When nitrogenous waste is present, typically in the form of animal and plant proteins and urea, the wetlands must facilitate the nitrogen cycle. To convert nitrogenous waste to nitrogen gas and fixed nitrogen in the form of nitrate salts, a combination of denitrifying and nitrifying organisms are needed. Nitrification involves conversion of nitrogen wastes such as urea, uric acid and ammonia to an oxygenated nitrogen species such as nitrites and nitrates. This step requires oxygen and relies on aerobic metabolism. Soluble phosphorous may also be reduced during the nitrification process as phosphorous is an integral part of the cellular energy generation cycle. Species such as nitrobacters and nitrosomonas facilitate the nitrification step. Such bacteria are typically known as lithotrophs and they derive their carbon from carbon dioxide. Nitrosomonas transform ammonia into nitrite while nitrobacter transform nitrite into nitrate. One potential problem arises in converting ammonia to nitrite; hydrogen ions are produced. A reduction in pH may prove unfavorable in some circumstances. To avoid a drop in pH, the alkalinity should be at least eight times the concentration of ammonia and ideally over 100 ppm. A pH around 8 is near optimal. This problem is more acute in fresh water than in sea water.

Anaerobic bacteria facilitate denitrification; the conversion of nitrites and nitrates to dinitrogen, an inert gas under most all environmental conditions. Most of these are known as facultative anaerobes since they can use nitrogen oxides instead of dioxygen as an electron acceptor in the terminal step of the electron transport chain. However, a carbon source is required for these bacteria to perform the denitrification step. Without a denitrifying step, nitrogen levels may increase to levels that are detrimental to the overall balance of the ecosystem. One particular condition that should be monitored is the anaerobic degradation of sulfur oxides. Anaerobic decomposition of sulfur oxides generates hydrogen sulphide, a foul smelling and corrosive gas.

For carbonaceous wastes, a certain level of nitrogen is required to accomplish conversion to biomass, carbon dioxide and water. Bacteria known as heterotrophs are responsible for the degradation of the major carbonaceous wastes in sewage. Most heterotrophic water purification processes reduce organic carbon to carbon dioxide via respiration. In most systems, nitrification will not proceed in the abundance of a soluble organic carbon source. As a general rule, the soluble carbonaceous BOD should be below 20 ppm (equal to 20 mg/l) for any significant degree of nitrification to occur.

Most microorganisms grow to a certain cell density at which time growth stabilizes, usually closely matching the rate of microbial death. Since wetlands function on the basis of microbial action, the wetland will also experience a lag phase before reaching a substantially steady operating state. During the start-up period, several processes occur including vegetative fill-in, root and rhizome development and growth, and microbial community establishment. In some constructed wetlands, the rocks or gravel serve as a substrate onto which microorganisms attach. When the microbial film thickens, microorganisms near the surface of the substrate may not get an adequate oxygen supply. Oxygen supply may be limited by the metabolism of the more exterior organisms or by the rate of oxygen transfer through the film. Some operations use forced water streams periodically to slough off the film and allow a new film to grow.

The following patents disclose information in related fields U.S. Pat. No. 5,486,291, entitled "Ecological Fluidized Bed Method for the Treatment of Polluted Water," to Todd and Shaw, discloses a fluidized bed remediation system for rapid nitrification and denitrification that introduces high pressure air to circulate buoyant particles. Compressors driven by wind or solar energy are used to provide the pressurized air. U.S. Pat. No. 5,527,453, entitled "Apparatus for Treating Dirty Water Aerated by Solar Powered Compressor," to Hachima, discloses a waste treatment device that uses a solar energy driven air compressor and Nitrosomonas and Nitrobacter. U.S. Pat. No. 5,156,741, entitled "Wastewater Treatment System and Method," to Morrison et al., discloses a remediation system that uses a submerged air pump to provide a dissolved oxygen concentration of at least 1 ppm to the roots of turf grass species. Typical operation involves recirculating over 50% of inlet wastewater. U.S. Pat. No. 5,087,353, entitled "Solar Aquatic Apparatus for Treating Waste," to Todd and Silverstein, discloses a series of at least three light-transmitting tanks containing photosynthetic bacteria, nonaquatic plants, and fish. U.S. Pat. No. 5,078,882, entitled "Bioconversion Reactor and System," to Northrop, discloses a three stage remediation system with a georeactor stage having optional air bubblers in a gravel filled bed 1 to 10 meters in depth.

Specific organisms contained within the system may indicate the degree of remediation. U.S. Pat. No. 4,959,084, entitled "Combined Air and Water Pollution Control System," to Wolverton, discloses a remediation system for the treatment of wastewater and polluted air. The system uses a water flow driven aspirator to create an air flow into the system. U.S. Pat. No. 4,906,359, entitled "Solar Activated Water Aeration Station," to Berthold, discloses a solar driven aeration station for introducing oxygen into a body of water at a predetermined depth. U.S. Pat. No. 4,443,337, entitled "Biological Treatment of Waste Water," to Otani et al., discloses a remediation system that uses an air compressor to provide a supply of dissolved oxygen.

Prior researchers have focused primarily on specific aspects of microbial, plant and animal species without a keen focus on creating microclimates and microhabitats or utilizing the potential of a given environment. Environmental changes associated with the seasons often complicate operation as well.

The present invention utilizes an optimized remediation system. This system utilizes low rates of air/oxygen flow and aeration; the aeration rate facilitates simultaneous nitrification and denitrification; and the aeration can be operated at lower temperatures and prevent freezing.

SUMMARY OF THE INVENTION (DISCLOSURE OF THE INVENTION)

The present invention is directed to a constructed wetlands system and method for the remediation of wastewater effluents. The system comprises utilizing at least one wetlands cell. Each cell comprises a wastewater effluent inlet, a remediated wastewater outlet, a bed (e.g. gravel with a depth of at least 12 inches, a top located below the horizon, an effluent inlet end and a remediated wastewater outlet end), a liner for preventing leakage of the wastewater from the cell to native soils, and remediation means for reducing waste in the wastewater effluent. Preferably, the bed comprises at least two substantially distinct layers of gravel, with the layers having a greater gravel size (e.g. thickness of at least 6 inches) near the bottom of the gravel bed and a progressively smaller gravel size (e.g. thickness of at least 2 inches) near the top of the gravel bed.

Preferably, the cells are much longer than they are wide. With the long length and aeration, a greater depth can be achieved. This greater depth allows a greater volume of wastewater to be treated in the same land area, reduces the amount of water that evaporates from the system, and allows for a wider variety of plant and animal life (e.g. plants with a longer root structure can aerate greater depths).

The process of aeration in the present invention permits simultaneous nitrification and denitrification, without additional devices or processes. This compares with prior art systems, which build up high levels of nitrites and nitrates, do not complete the nitrogen cycle nor reduce these substances to nitrogen gas by denitrification, or require digestion or similar processes to complete denitrification.

The present invention allows low rates of flow and aeration to be utilized. These low aeration rates facilitate simultaneous nitrification and denitrification. This aeration allows the system to operate at lower temperatures and may prevent freezing.

Aeration pipes, preferably arranged in a grid, deliver an oxygen-containing gas to the wastewater effluent. The pipes are perforated to deliver the gas throughout the length of the bed. Preferably, the oxygen-containing gas creates a dissolved oxygen concentration in the wastewater effluent greater than 0.25 ppm and preferably from 2 to 8 ppm. Solar energy, or other energy means, may be utilized to power the aeration system.

Plants are useful in accordance with the system of the present invention. Such plants include but are not limited to: *Iris pseudacorus, Iris versicolor, Rosa nutkana, Oenanthe javanica, Helianthis maximiliani, Scirpus validus, Typha latifolia, Acorus calamus variegatus, Acora calamus, Arundo donax, Sagittaria latifola,* and *Sagittaria falcata*. Plants are not required, but help to provide an adequate supply of carbon for the denitrification step, which typically occurs when the level of dissolved carbon is low.

Microorganisms are also useful in accordance with the present invention. These include but are not limited to Nitrobacter, Nitrosomonas, and nitrifying bacteria.

A primary object of the present invention is to construct a wetlands system that optimizes conditions for remediation of wastewater effluents and is inexpensive to construct and operate.

A primary advantage of the present invention is that the optimized constructed wetlands system requires a low level of maintenance because of a synergistic relationship with the environment.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

Figure 1:
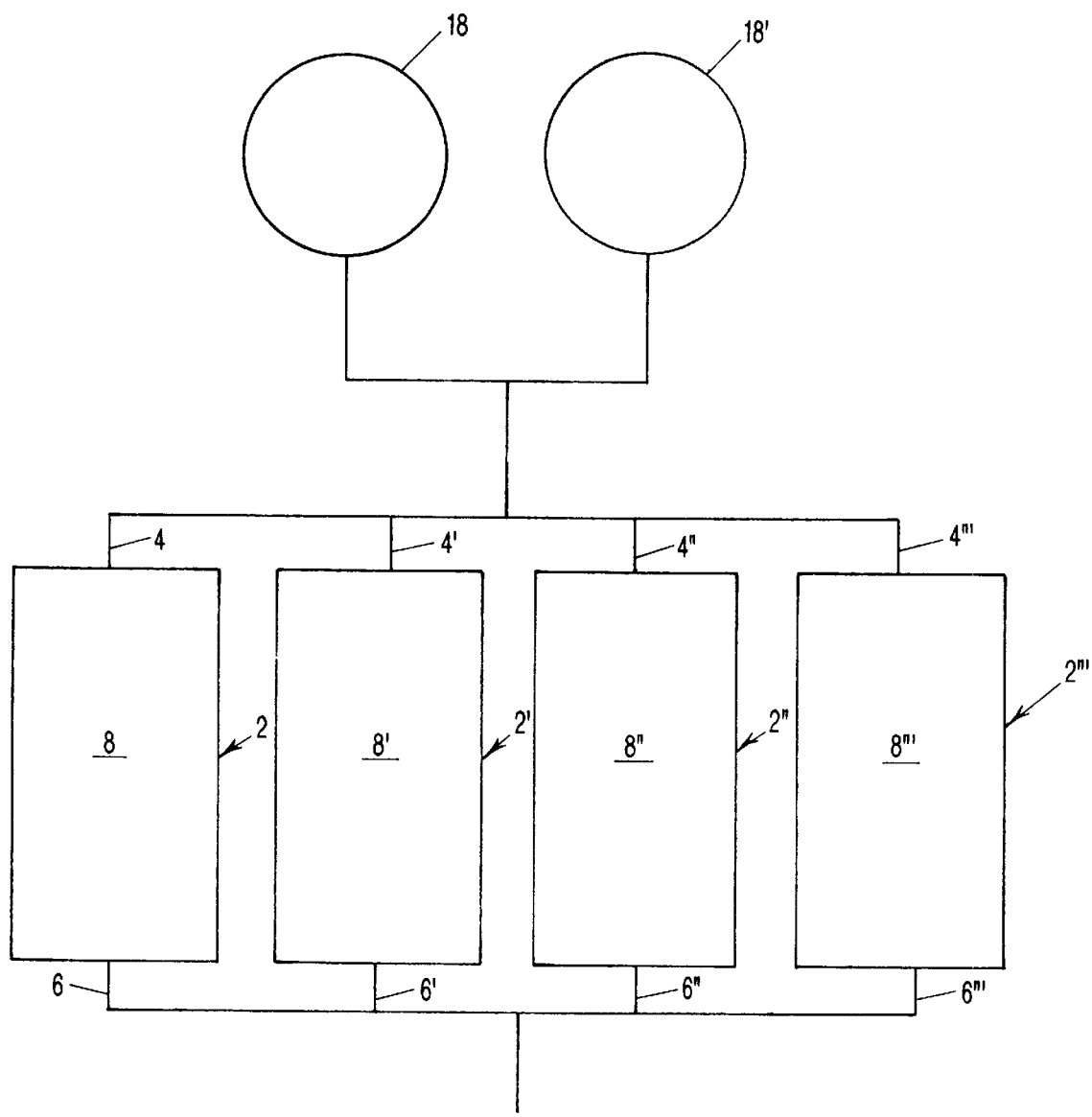
FIG. 1 is a schematic diagram of multiple wetlands cells in parallel connected to wastewater storage tanks of the present invention.

DESCRIPTION OF THE PREFERRED EMBODIMENTS (BEST MODES FOR CARRYING OUT THE INVENTION)

The remediation process has relatively distinct steps, such as reduction of carbonaceous waste, nitrification and denitrification. The conditions that produce optimal results for each of these steps differ. The reduction of carbonaceous waste may require a high level of dissolved oxygen, the nitrification step may need pH control, and the denitrification step benefits from an anaerobic environment. Factors such as the working depth of the wetlands and water temperature can be adjusted to decrease dissolved oxygen in lower layers. As the depth increases, resistance to oxygen transfer from the surface increases. With respect to temperature, dissolved oxygen solubility diminishes with increasing temperature. The present invention recognizes these factors and takes an integrated approach toward constructing a wetlands system that functions optimally and dynamically with the seasons, provides aesthetic value, and requires little energy input and maintenance.

The ability to maintain or adjust dissolved oxygen levels within the wetlands cells is a contributing factor to the success of the invention. Past efforts at wastewater remediation have, in general, not achieved an adequate dissolved oxygen profile throughout the wetlands. Without an adequate dissolved oxygen profile, denitrification will not occur in an efficient and effective manner. A system that breaks down carbonaceous waste and oxidizes ammonia to nitrite and nitrate will usually have an unacceptably high level of nitrogen in the outlet stream. The present invention overcomes such limitations through predominantly use of an ecosystem, an aeration system, and judicious choice of the overall design parameters.

Past efforts at constructed wetlands for sewage treatment also fail to take full advantage of the environmental conditions. In many instances, the environmental conditions may be manipulated to create microclimates or microhabitats where remediation processes will proceed more favorably. In addition, proper positioning of the various elements of a wetlands system in respect to existing microclimatic conditions will also produce tangible benefits. In harsh, arid environments, the elements must be arranged to maintain proper energy input, temperature and dissolved oxygen levels. Some environments are also susceptible to flash flooding and other water control problems. Rather than having such conditions hinder operation, the present invention allows surface water to be directed to different parts of the wetlands or be by-passed altogether. The wetlands may even be located next to a road, where a large volume of surface water is generally available. Gullies or ditches placed along the side of the wetlands cell may be used to control water and are considered within the scope of the present invention.

The present invention uses a constructed wetlands system for the remediation of wastewater effluents. The entire remediation facility uses at least one wetlands cell arranged in a variety of manners, including cells parallel or in series. The individual cells in a multicellular facility need not have an identical configuration.

As shown in FIG. 1, all wetland cells of the present invention 2, 2', 2", 2''' have a wastewater effluent inlet 4, 4', 4", 4''' and a remediated wastewater outlet 6, 6', 6", 6'''. Wastewater flows from the inlet to the outlet through bed 8, 8', 8'', 8'''. Bed 8 is preferably filled with gravel, although other material may be suitable for use in accordance with the invention. In perhaps the simplest configuration, bed 8 has an effluent inlet end and a remediated wastewater outlet end, although a plurality of inlets 4 and outlets 6 may be used.

Figure 2:
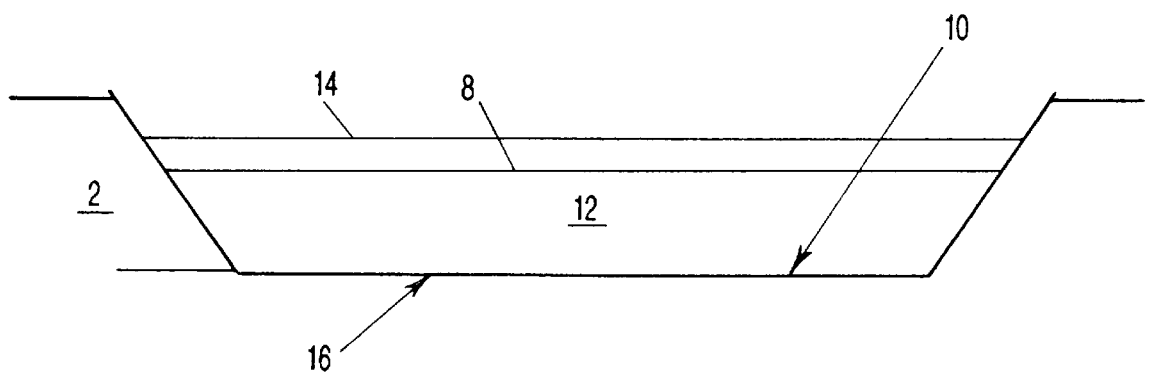
FIG. 2 is a cross sectional view of a preferred wetlands cell of the present invention.

A preferred configuration of bed 8 is the use of at least two substantially distinct layers of gravel 12, 14 having a greater particle size near the bottom of bed 8 and a progressively smaller gravel particle size near the top of bed 8, as shown in FIG. 2. For example, FIG. 2 shows gravel bed 8 having a bottom 10 with a depth of at least 12 inches and a top that is located below the horizon. A bottom layer of coarse gravel 12 with a thickness of at least 6 inches may lie beneath a top layer of pea gravel 14 having a thickness of at least 2 inches. A typical bed design has walls that rise at a ratio of 2:1. In addition, the cell is lined with liner 16 for preventing leakage of the wastewater from the cell to native soils. Typically, the material is clay or a polymeric material such as polyethylene with a thickness of approximately 40 mil. All cells comprise a means for reducing the waste concentration of the wastewater effluent.

For most applications, pretreatment of the wastewater effluent promotes efficient operation of the constructed wetlands cell. For instance, as shown in FIG. 1, the wastewater effluent may be stored in at least one storage tank 18, 18'. Storage tank 18, 18' serves as a settling stage to reduce the total suspended solids (TSS) content of the wastewater effluent. A reduction in total suspended solids will generally prolong operation of the wetlands cell since a reduced TSS minimizes clogging within the cell. Storage tanks 18, 18' are connected to the wetlands cells 2, 2', 2", 2''' for fluid flow to the wetlands cells 2, 2', 2", 2'''.

Microclimatic conditions are created around storage tank 18 to aid in pretreatment of the wastewater effluent. For instance, the exterior surface of tank 18 may be painted to help regulate radiative heating of the storage tank and its contents. If painted black, the tank absorbs radiation and heats the wastewater. Heated wastewater favors the growth of particular favorable organisms in the wetlands cell. However, oxygen solubility decreases with increasing temperature. Therefore, in some instances, a tank painted white promotes more efficient wetlands operation. To maximize radiative reflectance, a mirror-like finish minimizes radiative heating of the tank and its contents.

The area surrounding tank 18 may be adjusted to control heating or cooling of tank 18. A wind block or shield may reduce the exterior heat transfer coefficient or other covering device, such as a tent, shed, or lean-to. If the block/shield is lined with mirror or other reflecting or absorbing material, radiative heating of the tank may be controlled. Alternatively, the tank may be sheltered to minimize radiative heating.

Further, an aeration means powered by wind energy, solar energy, hydraulic energy, electrical energy, pneumatic energy, hydrocarbon-produced energy, and draft energy, may be used to increase the dissolved oxygen level of the wastewater effluent before it enters the wetlands cell. Many different modes of operation are possible and regulation at the storage tanks help to optimize operations. Again, storage tanks may use individually, or in combination, temperature regulation, dissolved oxygen level regulation, and/or mixing regulation.

Figure 3:
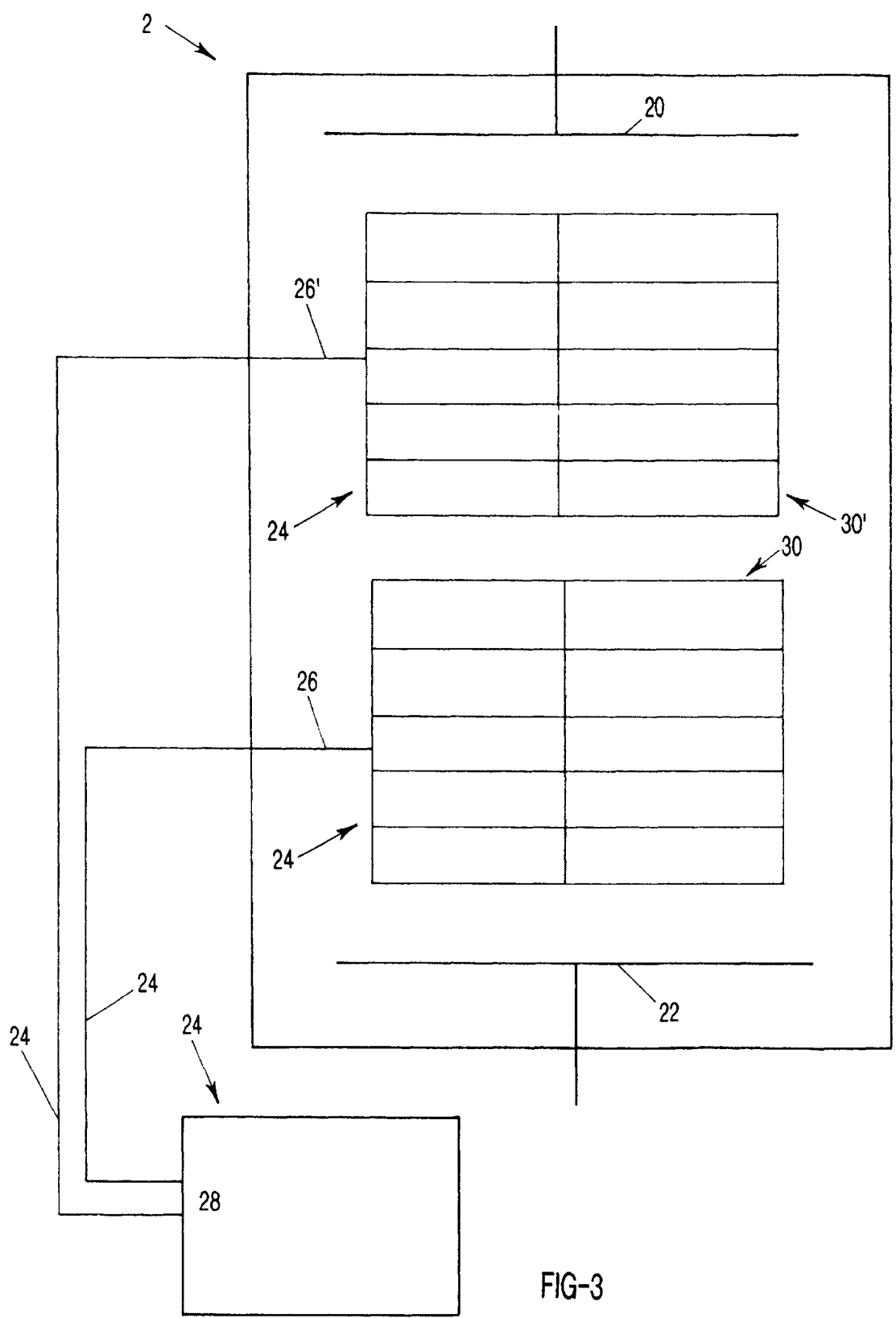
FIG. 3 is a schematic diagram of a single wetlands cell and an aeration system of the present invention.

FIG. 3 shows a typical configuration of cell 2, using header 20 for distributing wastewater effluent into the wetlands cell. On the distal end, collector 22 typically collects the remediated wastewater from the wetlands cell.

An important feature of the wetlands cell is the ecosystem contained within. The ecosystem performs a variety of chemical, physical, and biological functions that promote remediation of the wastewater effluent. Typically, organisms living within the wetlands cell demand oxygen beyond what may be provided naturally. To increase and control or regulate the dissolved oxygen level within the cell, an aeration mechanism or aeration system is utilized. FIG. 3 shows such an aeration system 24. In general, a compressed supply of an oxygen-containing gas 28 is fed into wetlands cell 2. The feed usually occurs through inlet manifold 26, 26', connected to oxygen-containing gas supply 28. Manifold 26, 26' distributes the gas to at least one subsurface aeration grid 30, 30' located within wetlands cell 2. Grid, 30, 30' delivers the oxygen containing gas from gas supply 28 creating a dissolved oxygen concentration in the wastewater effluent greater than 0.25 ppm and preferably from 1 to 8 ppm.

Figure 4:
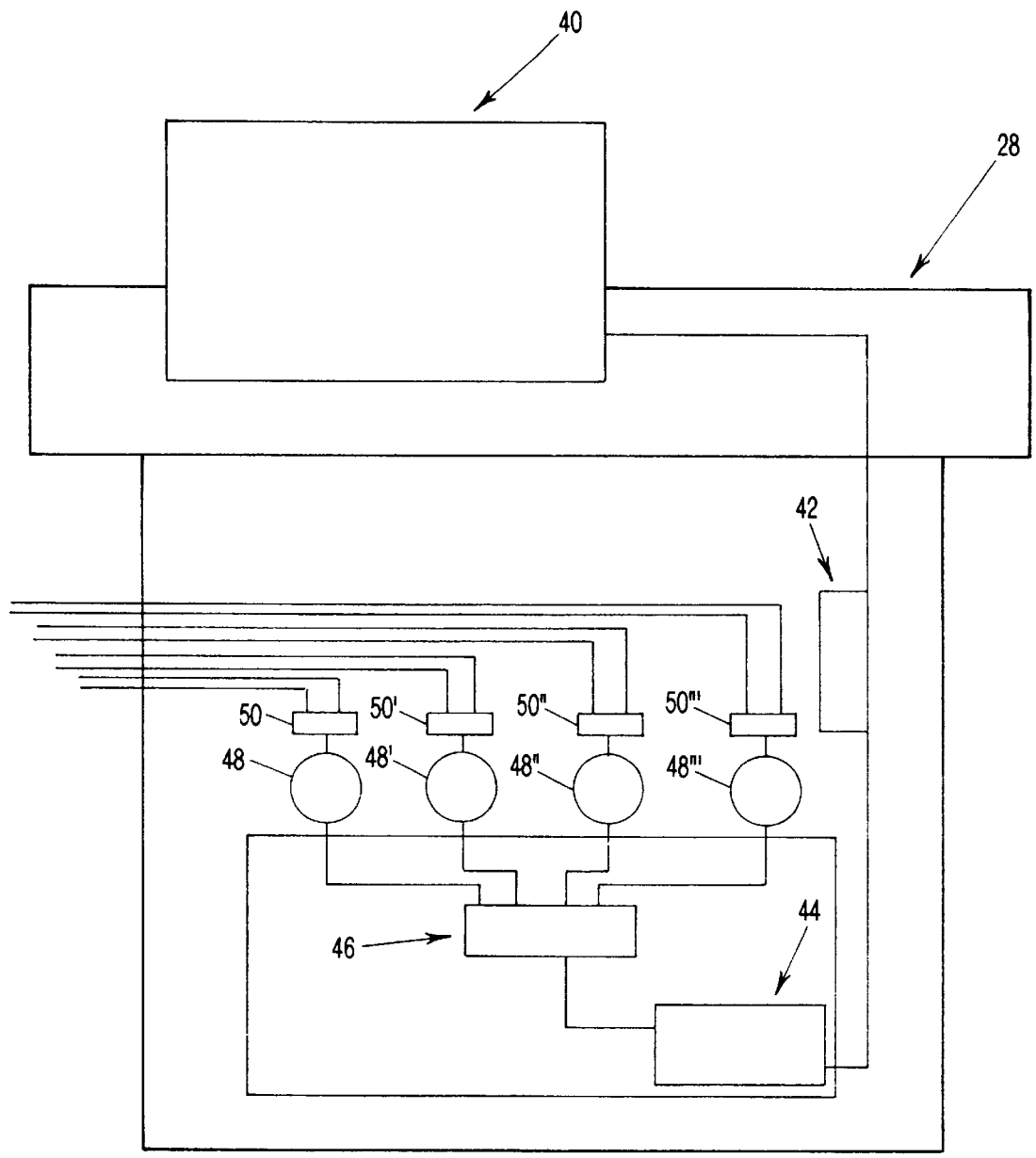
FIG. 4 is a schematic diagram of the aeration supply system of the aeration system of the present invention.
Figure 5A:
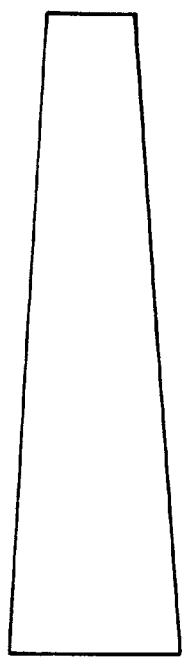
FIGS. 5*a–g* are diagrams of wetlands cell configurations of the present invention.
Figure 5B:
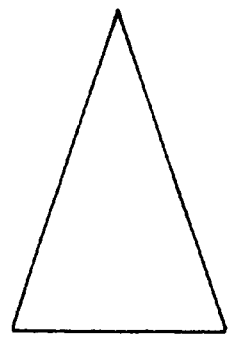
Figure 5C:
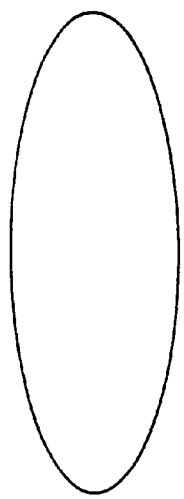
Figure 5D:
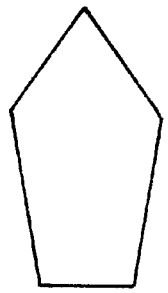
Figure 5E:
Figure 5F:
Figure 5G:
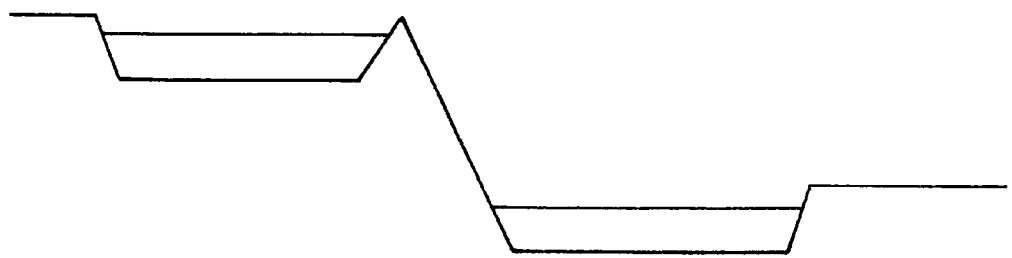

The oxygen-containing gas may come from several sources. One embodiment, as shown in FIG. 4, uses solar energy collector 40 for collecting and converting solar energy to electrical energy. The solar generated electrical energy then passes through a first controller 42 for distributing the electrical energy. Typically, the electrical energy will be stored in a storage device 44, such as a battery, however, it may be used immediately to create a potential energy difference. For instance, the energy may be used to pump water to a certain receiving vessel at an elevated location. Upon return, the water may drive a turbine that produces a supply of electrical energy or drives a compressor that may pressurize the oxygen-containing gas. A second controller 46 may be used for regulating the release of the stored energy supply. Ultimately, the energy is used to increase the dissolved oxygen level in the wetlands cell 2 or the wastewater storage tank 18. The embodiment shown in FIG. 4 uses at least one aeration pump 48, 48', 48", 48''' connected to at least one flow controller 50, 50', 50", 50''' to regulate the flow of stored electrical energy to pumps 50, 50', 50" and 50''' thereby producing a regulated source of compressed oxygen containing gas 28. Flow controller 50, 50', 50" and 50''' may comprise at least one timer, at least one flowmeter, at least one rotameter, at least one pressure regulator, at least one valve, at least one manifold for dividing the gas flow, and any other device for regulating and/or controlling the flow of the oxygen-containing gas to grid 30.

Referring to FIG. 4, for a solar driven aeration system, at least one solar panel 40 is needed to produce at least 4 Volt DC with a minimum of 1 ampere when loaded. The energy generated by the solar panel is stored in at least one battery 44 having a charge life of at least 10 ampere-hour, such as a sealed lead-calcium, gel-filled, deep cycle cells. In the present invention, when charged, the battery may hold an electrical-chemical potential sufficient to power an aeration pump 48 or bank of aeration pumps 48, 48', 48", 48''' for a period of at least 1 day without receiving further charge. Alternatively, the solar energy may be used to create a potential energy difference. For example, a water tank may be mounted at an elevation and a pump may be used to lift water to the elevated water tank. A control valve can be used to regulate the fall of the water through a turbine or other electricity generating device. The electricity created from the potential difference can be used to drive an aeration pump. Alternatively, the potential difference may be used to compress the oxygen-containing gas for flow to the wetlands cell or storage tank. Other configurations are possible. For instance, water in an elevated tank may be used to continuously drive a compressor to compress the oxygen-containing gas. A physical means of regulating the flow may be used, such as a pressure regulated valve. In this embodiment, the excess pressure bleeds off or is recovered in another form. The present invention is based on the principle of using the surrounding environment to provide a source of energy to drive the aeration system and other features of the invention.

Aeration grid 30 used to deliver the compressed oxygen containing gas to wetlands cell 2 may be configured as a series of interconnected pipes. Pipes having an inner diameter of at least one-quarter inch to one half inch manufactured from a rigid polymeric material are preferred. A plurality of such aeration grids 30, 30' are used to create different aeration zones within wetlands cell 2. For instance, near the wetlands cell's wastewater effluent inlet 4 where comparatively more carbonaceous waste is being degraded, the oxygen demand may be higher than near the remediated wastewater outlet 6 where a greater degree of denitrification may be taking place. By using more than one grid system, the rate of aeration can be directed to where it will yield a greater increase in efficiency. Other aeration control variables include frequency and duration. The frequency and duration of the aeration flow may be adjusted to achieve more efficient operation of constructed wetlands cell 2. In cell zones with a high-oxygen demand, the frequency and duration may be increased, whereas in zones with a low-oxygen demand, the frequency and duration may be decreased. The aeration system's flow control unit 50 has at a minimum a flow or pressure regulator and a timer capable of adjusting the frequency and/or duration of the flow of the oxygen-containing gas supply 28. When cells have multiple aeration grids 30, 30' one timer for each individual grid is preferable, although other embodiments may not use timers and may incorporate another method of regulating or controlling the gas flow to the wetlands cells. The timer may comprise a 24-hour timer with at least one daily event trigger. The flow rate control may be achieved through use of a rotameter, flow meter or similar device. When cells have multiple aeration grids 30, 30' at least one flow meter contained within each flow controller 50 is preferable.

The wastewater effluent is generally distributed into the wetlands cell 2 through header 20. Header 20 typically comprises a central pipe connected to a perforated pipe. Fluid flows from the central pipe to the perforated pipe at the inlet and from another perforated pipe to another central pipe at the outlet comprising collector 22. Pipes constructed from a polymeric material having an inner diameter of at least 2 inches are preferable.

The ecosystem comprises plants, bacteria and other organisms capable of remediating wastewater. The present invention is successful in remediating wastewater with or without use of plants. The present invention may utilize a diverse array of plants including, but not limited to *Iris pseudacorus, Iris versicolor, Rosa nutkana, Oenanthe javanica, Helianthis maximiliani, Scirpus validus, Typha latifolia, Acorus calamus variegatus, Acora calamus, Arundo donax, Sagittaria latifola,* and *Sagittaria falcata.* The arrangement of the plants within the wetlands cell may be chosen on the basis of aesthetic and functional criteria. Often, a synergy exits between the aesthetic and functional qualities of the selected plants. For instance, colorful plants like the irises may be selected for aesthetic reasons as well as their ability to treat waste in water. The sweet flag and New Mexico sunflower may be selected in for wetlands cells in the Southwestern United States on the basis of their native habitat and ability to treat waste in water. Certain species of plants may also attract native butterflies, other insects and birds.

Microorganisms living in the constructed wetlands cells are introduced through natural or other means. The microorganisms may include, but are not limited to, nitrobacter, nitrosomonas, and nitrifying bacteria. In some circumstances, introduction of at least one of these nitrogen-utilizing species helps to stabilize the process. Inoculation microorganisms can quickly start the bio-filtration process within the bed. Such practice may be particularly useful during a start-up phase or after a cold-weather period. The results of adding selected microorganisms appear as more complete nitrification and denitrification and reduced levels of pathogens (basically, other organisms have a hard time competing with a more populous species). The present invention utilizes select microorganisms to achieve these goals.

Wetlands require a period of adaptation to reach a stationary state in which monotonic time trends are absent. This period includes vegetative fill-in, root and rhizome development and growth, and microbial community establishment. With the oxygen being generated by the aeration system, development of the microbes is needed. The gravel media acts as the environmental substrate to which the bacteria attach. Microbial populations adapt quickly to their environment, and hence, there is a short adaptation period.

The addition and use of added microorganisms for the start-up period is necessary for quick results and population addition. Each group of microorganisms to be included in the wetlands should be specifically selected for their ability to remedy certain issues included in the wetlands. This increases the potential in the reduction of many forms of nitrogen and pathogens with a high degree of success. The removal success is based on the microbial activity with high levels of available dissolved oxygen and long residential time, e.g. greater than 7 days.

Nitrogen compounds are among the principal constituents of concern in wastewater. The nitrogen is very complex and difficult to control. Environmental factors that control nitrogen transformations are numerous and not always understood.

Using the system of the present invention, a total nitrification/denitrification process takes place within the wetlands cells itself. The treatment process of the slow subsurface aeration within each cell creates the perfect environment for simultaneous microbial nitrification and denitrification and the production of nitrous oxide ($N_2O$) and microbial biomass.

If biofilters are quick started with pure strains of nitrosomonas and nitrobacter, ammonia conversion occurs within two days and $NO_2$—N to $NO_3N$ conversion occurs within two weeks, with full nitrite conversion in 30 days. In the present invention, complete conversion occurs within five to seven days and occurs simultaneously within the same cells.

The subsurface aeration system meets and addresses the oxygen requirements of carbonaceous ($CBOD_5$) to reduce total nitrogen compounds. Carbonaceous $BOD_5$ is a measure of $BOD_5$ excluding the oxygen consuming process for conversion of ammonia to nitrites ($NO_2$) then to nitrite ($NO_3$) at five days. This conversion process occurs at a D.O. level as low as 0.6–0.7 mg/l.

Suspended solids within the effluent water are also consumed by sludge reducing bacterial, thus the marked reduction in $NH_4$—N (e.g. from 41 mg/l to as low as 2mg/l). Aerobic and facultative anaerobic microbes result in at least 60% reduction of net solids. Further reduction occurs as some species of microbes within the waste and sludge group utilize the oxygen in converting nitrate ($NO_3$) resulting in total removal of nitrogen. In this process, certain facultative anaerobes substitute for free oxygen, deriving oxygen from $NO_3$ in the reduction process.

At 20° C. the solubility Sn of oxygen in water is 3.2 mg/l, thus if;

Sn>3.2 mg/l then the reaction is oxygen flux limited. In this regime, the rate of nitrification is solely dependent upon the rate of diffusion of oxygen into the wastewater and since the rate of diffusion is constant at a given temperature the removal of nitrogen is similarly constant. Additionally, oxygen added to the effluent stream improves the nitrification rate.

When the bulk wastewater ammonia nitrogen concentration falls below 3.2 mg/l at 20° C., then the removal rate of ammonia becomes ammonia concentration controlled, i.e. the rate is proportional to [$NH_3$—N] where 0.5<n<1. In this regime, the rate of ammonia removal falls exponentially. Thus, there is lower removal per square foot of media surface.

This phenomena can be seen by examining the nitrification design curves published by the EPA. With effluent ammonia nitrogen concentrations in excess of 4 mg/l, the rate of removal per square foot of media surface is constant; however, below effluent ammonia levels of 3 mg/l, the rate of removal per square foot medial surface falls rapidly. It should be carefully noted that until the EPA curves indicate a linear fall in the rate of removal, the decrease observed is in fact exponential.

In order to determine maximum loading capacity of the reactor bed, the following equation is applied to model nitrogen removal capacity.

$$MV = \frac{AL \times E \times RA}{100 \times SSA} \text{ Where:}$$

$MV$ = Filter bed volume ($CF$)

$AL$ = Applied load pounds $NH_3$—N/$d$ $E$ = Nitrification efficiency required %

$RA$ = Specific surface area required per pound $NH_3$—N oxidated per day
(determined for gravel bed at 2000–4000 $SF$)

$SSA$ = Specific surface area of mixed gravel media $SF/CF$ ($ft^2/ft^3$).

Destruction or deactivation of pathogenic microorganisms is also within the scope of the present invention. The invention reduces total coliform count in the wastewater effluent. Animal waste typically contains a high level of $E.$ $coli$ bacteria. Certain strains of $E.$ $coli$ can endanger animal and human health, therefore a reduction in $E.$ $coli$ is desirable. One technique employed to reduce the level of harmful organisms is seeding during start-up or after shocks to the system. A shock occurs when a toxin or other contaminant enters the system and destroys most all the microbial life. During start-up or after a shock, no single population of microorganism dominates. In a sense, all species are competing for the same resources to survive. If one species, or several, are given a head-start through seeding, then it is likely that these species will dominate during the operation of the system. Reduction of pathogens also occurs if the selected species used to seed the system are fast growing and have doubling times greater than the pathogens. Other higher life forms may also play a role in pathogen reduction.

The invention also encompasses the addition of animal species by either natural means or by directly or indirectly introducing the species into the wetlands cell. Species of fish, amphibians, and other aquatic creatures may be introduced into the system. Synergistic effects are expected between some species.

Aesthetics may play an important part in the construction of the constructed wetlands. Therefore, the configuration of the wetlands cell is not limited to quadrilaterals. Possible configurations are shown in FIG. 5$a$ through FIG. 5$g$. The wetlands cell may even be substantially round. Some of the configurations play an important role in determining the efficiency of the wetlands cell. For instance, if the cell design shown in FIG. 5a has an inlet at the narrow part of the width and an exit at the wider part, the fluid has a slower fluid velocity near the exit. The type of flora and/or fauna may vary along the length of the wetlands cell. The wetlands cell configuration shown in FIG. 5g may be particularly advantageous for heating and/or aerating the wastewater during remediation. In principle, the upper wetlands cell fills with wastewater, the water then flows at a controlled rate over a weir and down to a lower wetlands cell. If the weir has a rough surface, the flow tends to be turbulent and incorporate more air. If the weir is painted a color that absorbs solar radiation, then the water will heat as it passes over the weir. Again, these designs stay within the nature of the invention and the principle of utilizing natural phenomena to aid the remediation process.

Another aspect of operational efficiency incorporated within the scope of this invention is fast and effective start-up. The present invention may be designed to achieve acceptable levels of remediation in a short period of time, e.g., less than one month.

The example detailed below further describes the invention.

EXAMPLE 1

A wetlands was constructed according to the invention for treating wastewater from an elementary school. The school is in a rural setting not served by a municipal sanitary sewer or domestic water systems. Because of this, onsite liquid waste disposal and a domestic water system (wells) are necessary. The school was served by a conventional septic tank and leachfield. Due to the relatively high population discharging to this existing system and the proximity to shallow groundwater table (6'), additional treatment of the effluent was necessary. In order to bring the site into compliance with state regulations, the constructed wetlands of the present invention was constructed. A conventional wastewater treatment system was deemed not feasible for many factors, including high cost and intense maintenance. Artificial constructed wetlands offered an attractive alternative for treating the domestic wastewater at the school site.

The site is served by two 8,000 gallon septic tanks. The septic tanks (pretreatment) remove the solids (primary sedimentation) from the domestic wastewater. The effluent then discharges by gravity to a duplex lift station. The lift station pumps the effluent approximately 900 feet to the east, to a previously undeveloped portion of the school site. Pumping occurs through a 4" forced main to the constructed wetlands site for further treatment.

The forced main discharges into a concrete distribution box. The distribution box splits the flow equally between the four independent wetlands cells. Each cell is approximately 110 feet long by 30 feet wide. Each cell is trapezoidal in section with 2:1 side slopes. Each cell was lined with a 40 mil polyethylene membrane to prevent leakage to the native soils. The cells were filled with 24 inches of gravel (18 inches of coarse gravel on the bottom, topped with 6 inches of pea gravel at the surface). The effluent is distributed to the cells from the distribution box. The flow is distributed within each cell via a four inch drain pipe header. The effluent is collected at the downstream end of each cell by another perforated four inch PVC drain pipe header. The treated effluent is collected from each cell and collectively discharged into a sampling manhole. From this point, the treated effluent flows by gravity to the absorption field. An overflow weir was built into the sampling manhole for maintaining proper water levels needed for maximum retention time and for future access to the treated effluent.

The design system accommodates approximately 650 students and 80 faculty and staff. This results in a flow of 13,300 gallons per day. The school operates five days per week. In order to provide a minimum of seven-day retention time, the design volume is five times the 13,300 gallons, thus 66,500 gallons. The anticipated flow is approximately 10,000 gallons per day; therefore, an overflow weir was incorporated into the sampling manhole to maintain a maximum water surface level at two inches below the surface of the pea gravel. This adaptation, combined with the actual flows being less than the design flows, affords retention time in excess of the seven days referenced above. The longer retention time allows for enhanced treatment of the effluent.

For this particular system, the cells were constructed with the long axis f the cell parallel to the direction of flow. This provides a longer distance and hence longer travel time from the distribution header to the collection header, maximizing contact time in the wetland cells. A summary of the physical description of the wetlands is summarized as follows:

| | |
|---|---|
| Number of Wetlands Cells | 4 |
| Length of Cell | 110 feet |
| Width of Cell | 30 feet |
| Average Depth | Approximately 2.2 feet |
| Area of Cell | 3,300 square feet |
| Volume of Cell | 7,200 cubic feet |
| Coarse Gravel Fill Depth | 1.5 feet |
| Fine Gravel Fill Depth | 0.5 feet |
| Free Volume of Gravel Bed | Approximately 2,400 cubic feet |
| Volume Occupied by Wastewater | Approximately 2,400 cubic feet |

| EQUIPMENT | QUANTITY | MANUFACTURER | MODEL | SPECIFICATIONS |
|---|---|---|---|---|
| Aeration Shed | 1 | Tuff Shed | Ranch | 6 ft. x 8 ft. |
| Fluorescent Lights | 2 | Thin-Lite | 191 | 8W, 12VDC, _9 amp |
| Solar Power Panel | 4 | Solarex | MSX-64 | 64 W, 17.5 VDC, 3.66 _amp |
| Solar Panel Frame | 1 | Zomeworks | 13-287 | Std Roof/Gnd MT |
| Lightning arrestor | 1 | | | |
| Controller | 1 | Morningstar | Prostar 30 | |
| Battery | 2 | Deka | 8G8D | 225 amp-hr, sealed Gel-Cell |
| Timer | 4 | Lumenite | DT-112-SR | 24-hour, 3 daily event |
| Pump | 4 | Gast | MOA-P101-JH | 1/16 HP, 1,800 rpm |
| Manifold | 4 | Keeton Industries | | |
| Flowmeter | 8 | Key Industries | FR4000-4A33 | 0.4–4.0 SCFH (0.06–0.66 cfm) |
| Check valve | 8 | Brady | | |

-continued

| EQUIPMENT | QUANTITY | MANUFACTURER | MODEL | SPECIFICATIONS |
| --- | --- | --- | --- | --- |
| Air Tubing | 72 LF | Pacific Echo | SPD10 | ½", ⅝", ¾" ID PVC |
| Air line | 1,660 LF | Jet Stream | | ½ inch ID, PVC, Schedule 40 |
| Aeration Grid | 960 LF | Netafim | TLDL 9-1201 | ½ inch ID, 0.92 gph, 12 inch c-c emitter |

The above described wetlands was designed for an average daily flow of about 10,000 gallons per day. The direction of flow coincides with the length of the cells. A locally manufactured utility building was used to house the solar power system. Interior lighting was supplied by two single tube 12 VDC fluorescent fixtures directly powered by the batteries. Four (4) parallel wired 64 watt solar power panels were mounted in a manufactured frame, on the roof of the structure. Although each panel produces 17.5 VDC at 3.66 amps at load, the system operates on 12 volts DC. This power is transmitted to the system controller which maintains a charge on two (2) 225 amp-hour batteries, provides power control to the pumps, and monitors the system. The batteries were sealed lead-calcium gel-filled deep cycle type made for solar power service. The batteries provide direct power to four (4) timers, which regulate the aeration pump operations. The gel cell batteries supply up to five (5) days of operating power for the pumps without being recharged, and do this for an estimated 200 times of total drain down; no-recharging cycles. The timers repeat up to three (3) daily events every day. The aeration pumps deliver approximately 0.575 cfm at 0.65 psig static head pressure.

The airflow is metered through eight (8) flowmeters with four (4) manifolds. Two (2) flowmeters are mounted on each manifold. Each manifold is connected to one aeration pump. Each flowmeter regulates air flow to a corresponding aeration grid within each wetland cell. Each flowmeter has an internal scale marked 0–40 Standard Cubic Foot per Hour (SCFH), for which each increment represents 0.0165 cfm at 0.87 psig (0.87 psig). A check valve was installed after each of the eight flowmeters to prevent backflow.

Brass draincocks were placed in the air lines, and another one and one-half feet of air line were added at the pump to place the draincocks at a lower elevation for periodic drainage. Clear, flexible, reinforced high-pressure PVC tubing was used to connect all of the aeration components together. All eight air lines were bundled into a 4 inch ID PVC pipe that exited the shed through a cutout in the building floor and via a trench.

These air lines, one-half inch (ID) rigid PVC (Schedule 40) pipe, were buried approximately two and one-half feet deep with a metalized warning tape placed six inches above them. This type of rigid pipe was used to prevent accidental damage to the air lines, in the event that work is needed in the wetlands enclosure during periodic maintenance. All air supply piping was pressure tested for 8 hours at 25 psi, to ensure that a tight seal was achieved during installation. Each of the four wetland cells have two subsurface aeration grids, one for the south half and one for the north half of each cell. The untreated effluent enters the wetland cells through an inlet manifold, made of 4 inch ID perforated PVC pipe, placed six inches up from the bottom of the cell at the south end of the cell. The south aeration grid is placed at the same height as the inlet manifold. The treated effluent exits through an outlet manifold, made of the same material, placed 4 inches up from the bottom of the cell at the north end. The north aeration grid is placed at the same height as the outlet manifold. The south aeration grid consists of 8 lines, on 6 foot centers from south to north. The north aeration grid consists of 5 lines, on 10 foot centers from north to south. Both grids have three lines at 10 foot centers from east to west. All of the aeration grids are set in five feet from the east and west sides of the cells. They are also set in five feet from the inlet/outlet manifolds. The grids are numbered clockwise, one to eight, starting at the south end, east cell, stopping at the north end, east cell. Each pair of grids in each cell is supplied with air from one pump.

This arrangement allows for more flexibility in distribution of dissolved oxygen for greater nitrification/denitrification of the effluent. Each air line is marked with a stick-on number, wrapped in clear sealing tape, corresponding to the number of the aeration grid that it serves. Special irrigation tubing with one-way emitters was used to provide air distribution. The current aeration schedule is one hour on seven hours off for each grid. Both grids in each cell are aerated at different pressure levels. The rotometers for the southsides of each cell are set for 14 SCFH (0.23 cfm) and the north end rotometers of each cell are set at 7 SCFH (.11 cfm). This lower rate supports and maintains the required levels of dissolved oxygen of at least 2.0 to 6.0 mg/l.

The following plants were purposefully planted in the cells: yellow water iris (*Iris pseudacorus*), blue water iris (*Iris versicolor*), wild rose (*Rosa nutkana*), water celery (*Oenanthe javanica*), New Mexico sunflower (*Helianthus maximiliani*), softstem bullrush (*Scirpus validus*) common cattail (*Typha latifolia*), variegated sweet flag (*Acorus calamus variegatus*), sweet flag (*Acora calamus*), and Mississippi mud cane (*Arundo donax*). The plants were positioned according to an 18-inch staggered grid system. Shorter plants were placed nearer the edges of the cells while taller plants were placed nearer the center of the cells. Colorful plants like the irises were selected for aesthetic reasons as well as their ability to treat waste in water. The sweet flag and New Mexico sunflower were selected on the basis of their native habitat and ability to treat waste in water. Another important aspect of the plants, not to be overlooked, is their ability to provide a carbon source for the microbial activity during the denitrification process. The denitrification process requires a carbon source. Often, other remediation processes reduce the soluble carbon level to such an extent that denitrification will not take place to any appreciable degree. This invention overcomes this problem by using plants in the cells in regions where denitrification may occur. Overall, in this invention, the plants play four main roles: to provide aesthetic value, to attract particular organisms, to treat wastewater, and to provide a carbon source to the microorganisms. The plants also work synergistically with the aeration system since the dissolved oxygen helps to maintain the well-being of the plant root systems. The plants were planted in the wetlands cells in October and full operation began two months later in December.

The wetlands system was designed to treat a wastewater effluent with total nitrogen concentration greater than 70 ppm. The remediated target values for the exiting flow were: total nitrogen levels less than 30 ppm and groundwater total nitrogen levels less than 10 ppm. On the basis of the aforementioned design criteria and the exit concentration levels, a hypothetical sub-surface aeration rate was chosen in an effort to simultaneously perform nitrification and denitrification. The target dissolved oxygen level within the cells was 2 ppm. To achieve this level of dissolved oxygen, an aeration rate of 0.3 cubic feet per minute per cell at a duration of 60 minutes and at a frequency of 3 times per day was anticipated. The wastewater feed into the constructed wetlands system had concentrations of ammonia nitrogen as high as 64.5 ppm and total Kjeldahl nitrogen levels as high as 91 ppm. The incoming total Kjeldahl nitrogen levels in the wastewater effluent ranged from 50 ppm to over 90 ppm. The remediated effluent exiting the wetlands cells gave a total Kjeldahl nitrogen level of less than 2 ppm. To support the conclusion of adequate denitrification, nitrate and nitrite levels were measured. Both wastewater effluent and remediated wastewater effluent had non-detectable levels of nitrite and nitrate. To verify these results, samples were sent to and tested by a state laboratory division. The state laboratory division confirmed the test findings. Therefore, nitrification and denitrification were taking place simultaneously within the wetlands cell according to design.

Solar powered air pumps were selected to aerate the cells. The pumps, oil-less diaphragm air compressors, were sized such that one pump could aerate a single cell. The electricity is generated by solar power panels and stored in batteries. Air is pumped into both the distribution and collection ends of each cell. This accomplished by a separate pipe that feeds each end of the cell sub-surfacely. Each pipe system is also provided with valves so that the discharged air can be directed to either the front and/or back end of the cells. In addition, they regulate the levels of air flow to each grid.

Air is delivered into each cell using a ½ inch diameter pvc piping. Once inside the cell, air is injected to the wastewater using ½ inch Netafim tubing in a nominal 10-foot by 10-foot grid pattern. The tubing has built-in one-way emitters at 12 inch center spacing. The grid was installed at six inches above the bottom of each cell. The front end grid aerates the incoming effluent from the distribution header to the approximate midpoint (50 feet) of the cell. The back end grid aerates the effluent from the approximate mid-point of the cell to the collection header (north end). Air is pumped to each cell at an average rate of 0.30 cfm/cell for 60 minutes every 8 hours, 3 times per day. This level of aeration changes as the conditions and demands change. Monitoring the dissolved oxygen with probes and actual sampling, along with other analylites is performed on a weekly basis and adjustments are made only after results from the laboratory are confirmed.

The pumps, controls, sampling equipment, and on-site records/logs of results are housed in a 6 foot by 8 foot structure, equipped with roof top mounted solar panels. The shed is located at the north end of the cells, between the wetlands and the absorption field. From this centralized location, adjustments in the aeration levels can be made within clear view of the wetlands cells.

The constructed wetlands project was designed to use solar power for the operation of a subsurface aeration system which enhances and accelerates the naturally occurring process (removal of total nitrogen) in the wetlands environment. The design of the aeration system was based on a dissolved oxygen requirement of at least 2 milligrams per liter (mg/l) in the effluent wastewater. This amount of oxygen is the minimum required to sustain microbial activity. This oxygen mass requirement was converted to an equivalent atmospheric air volume for the 5,000 foot elevation of the wetland location. This equivalent air volume was used to determine the required volume of air necessary to support nitrification. The required volume of air was based on the assumption that one-third of the volume of the gravel filled wetlands cells would consist of interstitial space.

The volumes of individual cells were calculated by the Average End Area Method (Kadlec & Knight, 1995). The total volume of any cell was 7,176 cubic feet (cf), and the volume of the interstitial space was approximately 2,392 cf per cell. The Ideal Gas Law (Kadlec & Knight, 1995) was used to convert a mass of one mole of air to an equivalent volume of air. This volume was used to determine the volume of air, in cubic feet per minute (cfm), for each cell. An air pressure value of 12.10 pounds per square inch, Absolute (psiA) (Ingersoll-Rand Company 1973, 34–134), was used in the Ideal Gas Law. The calculated air flow for each cell is 0.342 cfm for a twenty-four hour day cycle to achieve the required level of treatment.

Calculations for air flow through the system of the present invention were as follows: Objective: Determine cfm needed to supply sufficient oxygen to cells to enhance/support nitrification/denitrification of the effluent.

Analytical Methodology:

1) Find cfm based on volume of liquid in cell
2) Find cfm based on daily discharge
3) Compare required volumes with pump output to ensure that the pump can supply the required amount of air flow Part I:

1) Find cfm Based on Volume of Liquid in Cell
   Find Volume of Typical Cell (Average End Area Method)

| Elev (ft) | Area (sf) | Vol (cf) | Σ Vol (cf) |
|---|---|---|---|
| 5004.70 | 3,300 | | |
| | | 7,176 | |
| 5006.70 | 3,876 | | |
| | | | 7,176 |

2) Find Volume of Liquid of Typical Cell for Amount of Aeration Needed
   Interstitial Space of Gravel filled assumed to be ⅓ of total volume)
   Liquid Volume = Total Volume of Cell * ⅓
   = 7,176 ft³ * ⅓
   = 2,392 ft³
3) Convert Microbial $O_2$ mass needed to lbm/ft³
   Microbial $O_2$ mass needed = 2 mg/l as dissolved $O_2$ (assumed per 24 hour)
   2 mg $O_2$/cell = 4.4092 × 10⁻⁶ lbm $O_2$/ = 4.4092 × 10⁻⁶ lbm $O_2$/3.5315 × 10⁻² ft³
4) Find lbm $O_2$ required per cell (per 24-hour)
   lbm $O_2$/l = 4.4092 × 10⁻⁶ lbm $O_2$/3.5315 × 10⁻² ft³ * 2,393 ft³
   = 0.2987 lbm $O_2$
5) Convert lbm $O_2$ to lbm Atmospheric Air
   Assume $O_2$ comprises one-fifth of Atmospheric Air)
   lbm air = lbm $O_2$ * 5
   = 1.4933 lbm air/cell (24 hour)
6) Convert lbm/cell to cfm/cell
   a) Find ft³ ⅓ of air (Ideal Gas Law)
      Ideal Gas Law: pV = nRT
      p = pressure (psfA) = 12.10 lbf/in², A * 144 in²/ft² = 1742.40 lbf/ft²
      V = Volume (ft³) = unknown
      n = mole (in lbm) = 1 mole
      R = Universal Gas Constant = 1545.33 ft · lbf/lbm · mole · ° R.
      T = Temperature (° R.) = 70° F. = 529.67 ° R.
      Solve for V:

-continued $$pV = nRT = V = nRT/\rho = \frac{1 \text{ mole} * 1545.33 \text{ ft} \cdot \text{lbf/lbm} \cdot \text{mole} \cdot °R}{1742.40 \text{ lbf/ft}^2} = 469.76 \text{ ft}^3$$

b) Convert Volume of one mole air (ft$^3$) to Ft$^3$/lbm
    ___ mole air = 28.97 lbm
    ft$^3$/lbm = 469.76 ft$^3$/28.97 lbm
    = 16.2155 ft$^3$/lbm
c) Find Air Flow required for 24-hr (ft$^3$/24-hr)
    ft$^3$/24-hr = ft$^3$/lbm * lbm
    = 16.2155 ft$^3$/lbm * 0.2987 lbm
    = 4.8428 ft$^3$/24-hr
d) Convert Air Flow ft$^3$/24-hr to cfm
    24 hours = 1440 minutes
    cfm = ft$^3$/24-hr * 24-hr/1440 min = 4.8424 ft$^3$/24-hr * 24-hr/1440 min
    ___ = 3.363 × 10$^{-3}$ ft$^3$/min Part II: Find cfm based on Daily Design Discharge 7) Convert Daily Design Discharge from gallons/day (gpd) to liters
    Daily Design Discharge = 19,800 gpd = 18,737.791
8) Find lbm/l/cell/day (24-hr)
    Convert mg/1 to lbm/l
    from 3) above 2mg/1 = 4.4092 × 10$^{-6}$ lbm/l
    a) Find lbm O$_2$/cell/day
        lbm O$_2$/cell/day = 4.4092 × 10$^{-6}$ lbm/l * 18,737.791
        = 0.08262 lbm O$_2$/cell/day
9) Convert lbm/cell to cfm/cell
    a) Convert lbm O$_2$ to lbm Atmospheric Air
        (Assume O$_2$ comprises one-fifth of Atmospheric Air)
        lbm air = lbm O$_2$ * 5 = 0.08262 lbm O$_2$ * 5
        = 0.4131 lbm air/cell (/24-hr)
    b) Find Air Flow required for 24-hr (ft$^3$/24-hr)
        From 6) d) ft$^3$/lbm = 16.2155 ft$^3$/lbm
        ft$^3$/24-hr = ft$^3$/lbm * lbm
        = 16.2155 ft$^3$/lbm *0.4131 lbm
        = 6.6986 ft$^3$/24-hr
    c) Convert Air Flow ft$^3$/24-hr to cfm
        24 hours = 1440 minutes
        cfm = ft$^3$/24-hr * 24-hr/1440 min = 6.6986 ft$^3$/24-hr * 24-hr/1440 min
        = 4.6518 × 10$^{-3}$ ft$^3$/min Part III: Comparison 10) Hydrostatic Pressure against emitters in cells
    ___ = P$_o$ + ρ * g * h
    P = Pressure at depth = unknown (lbf/in$^2$,Absolute)
    P$_o$ = Reference pressure = 12.10 psiA (lbf/in$^2$,Absoulte)
    ___ = fluid denisty = 62.4 lbm/ft$^3$/32.2 ft/sec$^2$ = 1.9379 slugs
    g = gravitational acceleration = 32.2 ft/sec$^2$
    ___ = fluid depth = 2.0 ft
    P = P$_o$ + ρ * g * h
    = 12.10 lbf/in$^2$ + 1.9379 slugs * 32.2 ft/sec$^2$ * 2.0 ft
    = 12.10 lbf/in$^2$ + 124.8 lbf/ft$^2$/144 in$^2$/ft$^2$ = 0.87 lbf/in$^2$
    = 12.97 lbf/in$^2$ psia = 0.87 psig
    Pumps supply apprpximately 0.45 cfm @ 0.87 psig
11) Comparison
    cfm based on Volume of Liquid in Cell 3.363 × 10$^{-3}$ ft$^3$/min
    cfm based on Daily Design Discharge = 4.652 × 10$^{-3}$ ft$^3$/min
    0.45 ft$^3$/min >> 3.363 × 10$^{-3}$ ft$^3$/min
    0.45 ft$^3$/min >> 4.652 × 10$^{-3}$ ft$^3$/min The pumps were found to have sufficient air flow to support microbial activity.

These initial experiments were performed during the winter months and microbial activity was expected to be hampered due to the cold temperatures. However, the aeration system helped to maintain acceptable water temperatures. In aerated portions of the wetlands cells, the water temperature was 2 to 6 degree Celsius higher than in non-aerated portions of the wetlands cells.

This invention includes the use of an aeration system to warm wastewater during remediation in constructed wetlands. This invention permits use of constructed wetlands in climates with lower temperatures. Again, this aspect of the invention makes the constructed wetlands an integral part of the surrounding environment, takes advantage of available energy and distributes that energy for the efficient operation of the wetlands cells.

Sampling from the constructed wetlands was accomplished by isokinetic sampling techniques. Some results from the sampling are presented below for the invention of Example 1. Listed are the total nitrate nitrogen (NO$_3$), the total ammonia nitrogen (NH$_4$), the total suspended solids (TSS), the five day biochemical oxygen demands (BOD.), the dissolved oxygen concentration (DO), the fecal coliform count (FC), the pH, and the concentration of orthophosphate (Ortho or H$_2$PO$_4^-$).

|  | NO$_3$ | NH$_4$ | TKN | TSS | BOD$_5$ | DO | FC | pH | Ortho |
|---|---|---|---|---|---|---|---|---|---|
| SAMPLE 507 | | | | | | | | | |
| units | ppm | ppm | ppm | ppm | ppm | ppm | count | pH | ppm |
| Wetlands Inlet | ND | 66.1 | 62.6 | 38.0 | 244 | 0.3 | 2E + 5 | 7.0 | 17.0 |
| Wetlands Outlet | 0.3 | 0.8 | 2.4 | ND | 29.5 | 3.8 | <1 | 7.7 | 3.8 |
| SAMPLE 430 | | | | | | | | | |
| units | ppm | ppm | ppm | ppm | ppm | ppm | count | pH | ppm |
| Wetlands Inlet | ND | 68.4 | 79.7 | 46.0 | 140 | 0.1 | 1E + 6 | 7.7 | 10.7 |
| Wetlands Outlet | ND | 0.4 | 1.5 | ND | 29.8 | 2.8 | <1 | 7.4 | 2.9 |
| SAMPLE 424 | | | | | | | | | |
| units | ppm | ppm | ppm | ppm | ppm | ppm | count | pH | ppm |
| Wetlands Inlet | ND | 66.1 | 75.2 | 24.0 | 82.5 | 0.3 | 6E + 5 | 8.4 | 6.1 |
| Wetlands Outlet | ND | 0.6 | 2.1 | 5.0 | 20.5 | 4.6 | <1 | 7.6 | 2.7 |

-continued

| | $NO_3$ | $NH_4$ | TKN | TSS | $BOD_5$ | DO | FC | pH | Ortho |
|---|---|---|---|---|---|---|---|---|---|
| SAMPLE 409 | | | | | | | | | |
| units | ppm | ppm | ppm | ppm | ppm | ppm | count | pH | ppm |
| Wetlands Inlet | ND | 54.7 | 70.2 | 80.0 | 540 | 0.5 | 1E + 6 | 6.6 | 26.5 |
| Wetlands Outlet | ND | 0.3 | 1.8 | ND | 19.5 | 3.8 | <1 | 7.6 | 1.9 |
| SAMPLE 327 | | | | | | | | | |
| units | ppm | ppm | ppm | ppm | ppm | ppm | count | pH | ppm |
| Wetlands Inlet | ND | 72.7 | 85.5 | NA | 368 | 0.2 | 2E + 6 | 7.1 | 24.7 |
| Wetlands Outlet | ND | 0.4 | 1.0 | NA | 37.1 | 4.9 | <1 | 7.6 | 1.4 |
| SAMPLE 320 | | | | | | | | | |
| units | ppm | ppm | ppm | ppm | ppm | ppm | count | pH | ppm |
| Wetlands Inlet | ND | 53.9 | 67.8 | 40.0 | 420 | 0.5 | 5E + 5 | 6.6 | 20.1 |
| Wetlands Outlet | ND | 0.6 | 1.6 | ND | 57.9 | 3.6 | <1 | 7.5 | 1.5 |
| SAMPLE 318 | | | | | | | | | |
| units | ppm | ppm | ppm | ppm | ppm | ppm | count | pH | ppm |
| Wetlands Inlet | ND | 53.1 | 64.0 | 41.0 | 332 | 0.9 | 2E + 5 | 7.0 | 13.9 |
| Wetlands Outlet | ND | 0.2 | 1.4 | 6.0 | 105 | 3.8 | <1 | 7.6 | 0.7 |
| SAMPLE 310 | | | | | | | | | |
| units | ppm | ppm | ppm | ppm | ppm | ppm | count | pH | ppm |
| Wetlands Inlet | ND | 64.5 | 91.5 | 41.0 | 320 | NA | NA | 7.1 | 19.3 |
| Wetlands Outlet | ND | 0.2 | 1.3 | 2.0 | 86.3 | NA | NA | 7.5 | 2.6 |
| SAMPLE 122 | | | | | | | | | |
| units | ppm | ppm | ppm | ppm | ppm | ppm | count | pH | ppm |
| Wetlands Inlet | ND | 56.9 | 57.4 | NA | NA | 1.9 | NA | 7.6 | NA |
| Wetlands Outlet | ND | 0.3 | 1.4 | NA | NA | 6.1 | NA | 7.6 | NA |

The results from this example demonstrate that the constructed wetlands removed significant amounts of nitrogen and other waste materials from the wastewater effluent. The constructed wetlands reduced ammonia (sometimes referred to as ammonium or ammonium ion when combined with water). An important result of Example 1 is that no significant detectable level of nitrates appeared in the remediated wastewater exiting the constructed wetlands. This suggests that a near total nitrification/denitrification process took place simultaneously in the constructed wetlands cell. The treatment process of the slow sub-surface aeration within each cell created a favorable environment for the simultaneous microbial nitrification and denitrification and the production of nitrous oxide ($NO_2$) and microbial biomass.

The present invention accomplishes the remediation through a harmonious approach that minimizes external energy input and maintenance while at the same time creating a rather natural looking and aesthetic environment. The present invention pays attention to microclimatic condition as well as the synergy that arises from interacting flora, fauna, and various microorganisms.

The preceding examples can be repeated with similar success by substituting the generically or specifically described reactants and/or operating conditions of this invention for those used in the preceding examples.

The invention is useful for, among other applications, aquaculture systems, fish farm hatcheries recycling, shrimp farming, lake bed aeration treatment, biofiltration beds, water recycle system filtration, filtration for industrial and biological park aquariums, dairy wastewater lagoons, domestic wastewater lagoons, agricultural farming, industrial VOC's wastewater, and wastewater treatment polishing cells.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. An apparatus for remediating wastewater effluents, said apparatus comprising:
   at least one wetlands cell comprising a remediation system for simultaneous nitrification and denitrification of said wastewater; and
   a locationally-based variably-controllable aeration system.

2. The apparatus of claim 1 wherein said remediation system comprises a short-term nitrification and denitrification system.

3. The apparatus of claim 2 wherein said remediation system comprises a 5–7 day nitrification and denitrification system.

4. The apparatus of claim 1 wherein said wetlands cell further comprises at least one wastewater effluent inlet.

5. The apparatus of claim 4 wherein said inlet comprises at least one storage tank.

6. The apparatus of claim 5 wherein said surface comprises an absorbing finish.

7. The apparatus of claim 6 wherein said absorbing finish comprises at least one finish selected from the group consisting of black, blue, and brown.

8. The apparatus of claim 5 wherein said surface comprises a reflecting finish.

9. The apparatus of claim 8 wherein said reflecting finish comprises at least one finish selected from the group consisting of white, silver and mirror-like.

10. The apparatus of claim 5 wherein said storage tank further comprises a cover.

11. The apparatus of claim 10 wherein said cover comprises at least one cover selected from the group consisting of a tent, a shed, a lean-to, a shield, and a wind-block.

12. The apparatus of claim 4 wherein said wetlands cell further comprises at least one remediated wastewater outlet.

13. The apparatus of claim 12 wherein said wetlands cell further comprising a bed having walls.

14. The apparatus of claim 13 wherein said walls rise at a ratio of approximately 2:1.

15. The apparatus of claim 13 wherein said bed comprises a length greater than its width.

16. The apparatus of claim 13 wherein said bed comprises:

a bottom;

at least one effluent inlet end; and at least one remediated wastewater outlet end.

17. The apparatus of claim 16 wherein said wetlands cell comprises:

header for distributing said wastewater effluent from said effluent inlet to said bed; and at least one collector for collecting remediated wastewater from said bed.

18. The apparatus of claim 17 wherein said header and said collector comprise: a central pipe; and a perforated pipe connected to said central pipe.

19. The apparatus of claim 18 wherein said central pipe and said perforated pipe comprise a flow path for said effluent and said remediated wastewater.

20. The apparatus of claim 16 wherein said bed comprises at least two distinct layers of particles.

21. The apparatus of claim 20 wherein said layers comprise a decreasing size of particles from a lower level to an upper level.

22. The apparatus of claim 21 wherein said particles comprise gravel.

23. The apparatus of claim 21 wherein said lower layer comprises a thickness of at least six inches.

24. The apparatus of claim 21 wherein said upper layer comprises a thickness of at least 2 inches.

25. The apparatus of claim 24 wherein said upper layer comprises gravel.

26. The apparatus of claim 16 wherein the bottom of said bed comprises a depth of at least twelve inches.

27. The apparatus of claim 13 wherein said bed further comprises a liner.

28. The apparatus of claim 27 wherein said liner comprises at least one material selected from the group consisting of clay and polyethylene.

29. The apparatus of claim 1 wherein said remediation system comprises an ecosystem.

30. The apparatus of claim 29 wherein said ecosystem comprises nitrifying bacteria.

31. The apparatus of claim 30 wherein said nitrifying bacteria comprises at least one microorganism selected from the group consisting of nitrobacter and Nitrosomonas.

32. The apparatus of claim 29 wherein said ecosystem further comprises at least one plant species.

33. The apparatus of claim 32 wherein said plant species comprises at least one species selected from the group consisting of *Iris pseudacorus, Iris versicolor, Rosa nutkana, Oenanthe javanica, Helianthis maximiliani, Scirpus validus, Typha latifolia, Acorus calamus variegatus, Acora calamus, Arundo donax, Sagiftaria latifola,* and *Sagiftaria falcata.*

34. The apparatus of claim 32 wherein said aeration system comprises a system to supply compressed oxygen-containing gas.

35. The apparatus of claim 34 wherein said aeration system comprises at least one aeration grid.

36. The apparatus of claim 35 wherein said aeration grid comprises a series of interconnected pipes.

37. The apparatus of claim 35 wherein said aeration system further comprises one aeration controller for each of said aeration grids.

38. The apparatus of claim 37 wherein said aeration controller comprises a separately-regulatable flow valve.

39. The apparatus of claim 29 wherein said ecosystem comprises at least one creature.

40. The apparatus of claim 39 wherein said creature comprises at least one creature selected from the group consisting of fish, amphibians, and aquatic creatures.

41. The apparatus of claim 1 wherein said aeration system comprises at least one system selected from the group consisting of wind energy, solar energy, hydraulic energy, electrical energy, pneumatic energy, hydrocarbon produced energy, and draft energy.

42. The apparatus of claim 1 further comprising a remediation tool for at least one water use selected from the group consisting of fish hatcheries, recycling, shrimp farming, lake bed aeration treatment, biofiltration beds, filtration for industrial and biological park aquariums, dairy and domestic wastewater lagoons, agricultural farming, and wastewater polishing cells.

43. The apparatus of claim 1 wherein said remediation system comprises a nitrification and denitrification system without plants.

44. A method for remediating wastewater effluents comprising the following steps:

a) introducing wastewater effluent into a wetlands cell;

b) nitrifying the effluent;

c) denitrifying the effluent to yield a remediated product;

d) expelling the remediated product from the wetlands cell, wherein steps (c) and (d) are performed simultaneously; and e) before and concurrently with step (b), aerating the effluent with a positionally selectively-variable aeration system.

45. The method of claim 44 wherein the step of introducing wastewater effluent into a wetlands cell comprises introducing wastewater through a wastewater effluent inlet.

46. The method of claim 45 wherein the step of introducing wastewater effluent into a wetlands cell comprises introducing wastewater into the bed which rises at a ratio of approximately 2:1.

47. The method of claim 46 wherein the step of introducing wastewater effluent into a wetlands cell comprises introducing wastewater into the bed comprising at least two distinct layers of particles.

48. The method of claim 47 wherein the step of introducing wastewater into the bed comprising at least two distinct layers comprises introducing wastewater into at least two distinct layers of gravel in the bed.

49. The method of claim 48 wherein the step of introducing wastewater into the bed comprising at least two distinct layers comprises introducing wastewater into a lower layer of the bed comprising a thickness of at least six inches.

50. The method of claim 49 wherein the step of introducing wastewater into the bed comprising at least two distinct layers comprises introducing wastewater into an upper layer of the bed comprising a thickness of at least two inches.

51. The method of claim 44 wherein the steps of nitrifying and denitrifying comprise nitrifying and denitrifying in an ecosystem.

52. The method of claim 44 wherein the steps of nitrifying and denitrifying in an ecosystem comprise nitrifying and denitrifying in an ecosystem comprising nitrifying bacteria.

53. The method of claim 52 wherein the steps of nitrifying and denitrifying in an ecosystem comprises nitrifying and denitrifying in an ecosystem comprising at least one microorganism selected from the group consisting of nitrobacter and Nitrosomonas.

54. The method of claim 53 wherein the step of aerating the effluent comprises aerating to supply compressed oxygen-containing gas.

55. The method of claim 54 wherein the step of aerating the effluent comprises creating a dissolved oxygen concentration greater than approximately 0.25 ppm in the effluent.

56. The method of claim 55 wherein the step of aerating the effluent comprises creating a dissolved oxygen concentration between 1 and 8 ppm.

57. The method of claim 53 wherein the step of aerating the effluent comprises aerating with at least one aeration grid.

58. The method of claim 44 wherein the steps of nitrifying the effluent and denitrifying the effluent are conducted within approximately 5–7 days.

59. The method of claim 44 wherein the steps of nitrifying and denitrifying the effluents comprise nitrifying and denitrifying in the absence of plant life.

* * * * *